US007956479B1

(12) United States Patent
Bergman

(10) Patent No.: US 7,956,479 B1
(45) Date of Patent: Jun. 7, 2011

(54) ELECTRICAL POWER GENERATION FROM RECIPROCATING MOTION OF FLOATS CAUSED BY WAVES

(76) Inventor: Ernest Bergman, San Pablo, CA (US)

( * ) Notice: Subject to any disclaimer, the term of this patent is extended or adjusted under 35 U.S.C. 154(b) by 0 days.

(21) Appl. No.: 12/639,793

(22) Filed: Dec. 16, 2009

Related U.S. Application Data

(60) Provisional application No. 61/175,895, filed on May 6, 2009.

(51) Int. Cl.
*F03B 13/00* (2006.01)
(52) U.S. Cl. .......................................................... 290/53
(58) Field of Classification Search .................... 290/53; 60/495
See application file for complete search history.

(56) References Cited

U.S. PATENT DOCUMENTS

| | | | | |
|---|---|---|---|---|
| 2,715,366 | A | * | 8/1955 | Vartiainen ..................... 417/333 |
| 3,487,228 | A | * | 12/1969 | Kriegel ............................ 290/52 |
| 3,515,889 | A | * | 6/1970 | Kammerer ....................... 290/53 |
| 3,664,125 | A | * | 5/1972 | Strange ............................. 60/398 |
| 4,622,473 | A | * | 11/1986 | Curry ............................... 290/53 |
| 4,742,241 | A | * | 5/1988 | Melvin ............................ 290/53 |
| 4,834,014 | A | | 5/1989 | Olsen |
| 6,812,588 | B1 | | 11/2004 | Zadig |
| 7,199,481 | B2 | * | 4/2007 | Hirsch ............................. 290/42 |
| 7,298,054 | B2 | * | 11/2007 | Hirsch ............................. 290/42 |
| 7,585,131 | B2 | | 9/2009 | Oigarden et al. |
| 2003/0079877 | A1 | * | 5/2003 | Wellington et al. ........ 166/272.1 |
| 2008/0260548 | A1 | * | 10/2008 | Ahdoot ........................... 417/333 |
| 2009/0008941 | A1 | * | 1/2009 | Irti .................................. 290/53 |

OTHER PUBLICATIONS

Grays Harbor Ocean Energy Company LLC; Demonstration Project; http://www.graysharboroceanenergy.com/demo_project.htm; 2008-2010; Westport, Washington and Ocean Shores, Washington; 2 pages.
Grays Harbor Ocean Energy Company LLC; New Mid-Depth Turbine Platform; http://www.graysharboroceanenergy.com; Nov. 5, 2010; Westport, Washington and Ocean Shores, Washington; 7 pages.
Seewec; Sustainable Economically Efficient Wave Converter; 2004; http://wwwseewec.org;Lokstad, Denmark; 2 pages.
Leirbukt, Albert; Tubaas, Peter; A Wave of Renewable Energy; 2010; http://www02.abb.com/global/gad/gad02077.nsf/lupiongprint/d74F5739aae738F6c12...;Norway; 4 pages.

* cited by examiner

*Primary Examiner* — Joseph Waks
(74) *Attorney, Agent, or Firm* — Charles L. Thoeming

(57) ABSTRACT

An apparatus, system and method for generating electricity by using the reciprocating motion of floats caused by waves includes a plurality of cylindrical floats each traveling on a cylinder push rod. The wave motion through the floats forces hydraulic fluid in a closed loop hydraulic system into a hydraulic motor, and converts the kinetic energy of the linear float motion to rotary motion to drive electrical generators.

15 Claims, 7 Drawing Sheets

| DESCRIPTION | FORMULA | RESULT |
|---|---|---|
| Volume of water displaced | 3.14 x 24.26 x 3.284 | 1585.3 cubic feet |
| Weight of water displaced | 1585 cu. ft. x 64 lbs. | 1,014,592 lbs. |
| Vertical wave travel | 3.28 ft. x 3 seconds | 60 ft. per minute |
| Total energy | 1,014,592 lbs. x 60 ft. per minute | 60,875,520 ft. lbs./min. |
| Horsepower generated | 60,875,520 ft. lbs./min. /33,000 | 1844.712 hp |
| kW generated by 1 module [20 floats] | 1844 hp x 640 | 1180 kW |

*Fig. 11*

| WAVE HEIGHT (M) | KWH | ANNUAL HOURS | KW/YR |
|---|---|---|---|
| 1 | WEC – 334<br>AUX – 866 | 2,570 | 3,084,000 |
| 2 | WEC – 668<br>AUX – 532 | 2,561 | 3,073,200 |
| 3 | WEC – 1002<br>AUX – 198 | 1,580 | 1,896,000 |
| 4 | WEC – 1200<br>AUX – 0 | 850 | 1,200,850 |

*Fig. 12*

| ANNUAL HOURS | KW/YEAR | RATE (U.S. AVG.) | GROSS REVENUE |
|---|---|---|---|
| 7,561 | 9,073,200 | $0.16 | $1,451,712 |

*Fig. 13*

ELECTRICAL POWER GENERATION FROM RECIPROCATING MOTION OF FLOATS CAUSED BY WAVES

CROSS-REFERENCES TO RELATED APPLICATIONS

This United States non-provisional patent application is based upon and claims the filing date of U.S. provisional patent application Ser. No. 61/175,895 filed May 6, 2009.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to harnessing the kinetic energy of waves. More particularly, the invention is related to an apparatus, system and method for generating electricity by using reciprocating linear motion of floats caused by waves, and converting the resultant linear kinetic energy into rotational kinetic energy capable of driving electrical generators.

BACKGROUND OF THE INVENTION

Several methods for generating, collecting, and dispersing energy for useful purposes have been developed and have made life much more productive and comfortable. The most common methods are windmills, water wheels, and, recently, solar, coal, and gas. These methods require sacrificing natural resources. Of these three, water, wind and sun, water is capable of generating the most energy within limited volume and space considerations because of its much greater density.

Waves provide a form of renewable energy created by wind currents passing over open water. Capturing the energy of waves in onshore and offshore locations has been demonstrated as technically feasible. Continued research to develop improved designs of wave energy is underway. Working prototypes have been deployed in the U.K. and the U.S.

Hydroelectric power plants are indicative of the tremendous amount of energy that can be generated without depleting natural resources. Recently, scientists and is engineers have turned to tides and ocean waves as an abundant source of energy. Scientific research revealed that ocean waves are "standing" waves. The energy in the wave does not move forward with the wave form, but transfers its energy from one molecule to another. Ships at sea, with engines idle, are not propelled forward, but rise and fall with the waves.

Waves contain roughly 800 times the kinetic energy of wind and approximately 4 times the energy potential of a comparative solar array. Accordingly, a wave energy power plant should be more efficient and require a smaller, less conspicuous footprint to produce an equivalent amount of power.

The Grays Harbor Ocean Energy Company has obtained a federal permit for a demonstration project at Grays Harbor in Washington State. This company has applied for permits for developing seven sites, each such site covering an area of about 100 square miles, and capable of generating up to 1000 megawatts. The proposed Grays Harbor project does not discuss the biggest obstacle in such a large area footprint for each site, namely how to interconnect 100 square miles sites and deliver the collected energy to coastal communities. By comparison the apparatus, system and method for generating electricity using the reciprocating motion of floats caused by waves is calculated to generate up to 1000 megawatts on 40 foot square module sites within sight of the shore. The apparatus, system and method for generating electricity by using the reciprocating motion of floats caused by waves is modular in design and is intended to consist of many modules linked to each other to provide significant amounts of electrical energy to neighboring electrical grid systems.

Fred Olsen's project in Norway has similar characteristics to the apparatus, system and method for generating electricity by using the reciprocating motion of floats caused by waves. Olsen utilizes floats to collect the energy from waves. Olsen estimates his design will generate as much as 2.5 megawatts million from 6 meter high waves within 9 seconds. The cost of building Olsen's full-scale project is estimated to run between €3-4 million and Olsen's goal is to market power for €2.8 per kilowatt hour. The 1:3 scale research model measures 12×12 meters. The full-scale version will be 36×36 meters. One modification of the apparatus, system and method for generating electricity by using the reciprocating motion of floats caused by waves increases the size of modules to 40 feet×50 feet and each module would generate the same amount of energy from 12 foot waves within 6 seconds.

The apparatus, system and method of electrical power generation utilizing reciprocating motion of floats caused by waves traveling vertically takes advantage of this vertical thrust. The energy in the flow traveling upward can be determined by a basic formula, i.e., the volume of water displaced by the float expressed as the weight of the water displaced times the upward travel distance in feet traveled by the float. Published data on wave height, frequency and spacing provide information needed for calculating the energy generated at selected locations. Statistical data of these conditions for most coastal areas are available, and can be utilized for designing power plants to meet the desired amount of energy required at convenient locations.

Protecting our environment is one of the prime considerations of the apparatus, system and method of wave power generation utilizing reciprocating motion of floats caused by the waves. The physical separation of the float on top of the way of collecting energy is a significant barrier that maintains the distance from the water in the hydraulic system and avoids any potential for cross contamination of the water or the machine.

A further objective of the apparatus, system and method for generating electricity by using the reciprocating motion of floats caused by waves is to provide a practical method of providing significant energy from renewable resources without resorting to depleting other resources. Any apparatus driven by a combustible hydrocarbon powered engine will only run if sufficient amounts of economically priced fuel are available.

This relationship is also true for engines powered by waves. Not all wave access provides a suitable site for converting waves into useable energy. An intelligent, practical design must also be located in an environment conducive to allowing the wave drive engine to perform efficiently and meet its design potential. Site selection and adaptation of the engine to its environment are keys to the degree of success of any apparatus, system and method for generating electricity by using the reciprocating motion of floats caused by waves.

The ideal site for apparatus, system and method for generating electricity by using the reciprocating motion of floats caused by waves should, at the very least, include, but not necessarily be limited to: 1) a site reasonably accessible to traffic for construction, operation and maintenance; and 2) a site providing consistent waves over sustained periods for dependable supplies of energy for intended users.

The proposed energy source also must be capable of supplying sufficient power for the demands of adjacent communities.

Yet another principal objective of the apparatus, system and method of electrical power generation utilizing reciprocating motion of floats caused by waves is to attain sustainable sources of environmental friendly power and quantities that will meet our needs for now and for future generations. The apparatus, system and method of electrical power generation utilizing reciprocating motion of floats caused by waves is based on modular concepts that can be repeated. The apparatus, system and method of electrical power generation utilizing reciprocating motion of floats caused by waves meet these goals with practical solutions.

DISCLOSURE OF INVENTION

A plurality of floats or buoyancy modules are welded to form a plurality of separate float cylinders 10. Each float cylinder 10 has domed or drum ends, top and bottom, and 12 respectively, and a central tube seam 18 welded to the domed or drum ends. The top dome or drum end 14 for each float cylinder 10 includes an air valve 16 similar to those used in inflating pneumatic tires. The float cylinder 10 assembly is air tight and is inflated with pressurized air and tank tested to ensure each float cylinder 10 is leak free. A permanent corrosion free tag is affixed to each cylinder drum or dome top end 14 to certify the integrity of the float cylinder 10. The test date and testing agency performing the certification is provided on the attached tag.

Guide bearings 20 on the top end 14 and bottom end 12 of each float cylinder 10 allow the float cylinder 10 to slide freely up and down a cylinder push rod 26, and each float cylinder 10 and associated cylinder push rod 26 to slide freely up and down within a pier mounted point absorber superstructure assembly 200 situated within and above a portion of ocean, sea, gulf, bay or lake. A separate guide bearing 22 affixed to the pier mounted point absorber superstructure assembly 200 further allows the float cylinder 10 and associated cylinder push rod 26 to slide freely up and down within the pier mounted point absorber superstructure assembly 200 in precise vertical alignment with a piston 30, and in conjunction with guide bearings 20. Guide bearing 22 and the pier mounted point absorber superstructure assembly 200 serves to limit the lower vertical travel of the float cylinder 10.

A travel stop 24 is affixed to the cylinder push rod 26 to limit the upper vertical travel of the float cylinder 10 on the cylinder push rod 26. In this manner, the cylinder push rod 26 raises and lowers a piston assembly 30 in response to the rising and falling of the float cylinders 10 in response to the action of waves 500. The piston assembly 30 travels in the cylinder 36 in a sequential fashion that extends each piston assembly 30 travel to the total distance between high and low levels of the travel stop 24 within each wave 500 cycle.

A machined cylinder 36 of suitable length and internal diameter allows the piston assembly 30 to travel the predetermined length of one third of the total distance of high and low limits of the travel stop 24.

A threaded custom pipe flange threaded onto the top end of the machined cylinder 36 has two rows of concentric bolt circles, the circles arranged as an outer row and an inner row. The outer row of bolt circles is provided to bolt the cylinder 36 to the structural support. The inner row of bolt circles is provided for bolting a custom "Y" fitting 50 to the pipe flange. Each custom "Y" fitting 50 has two one-way check valves. An intake manifold 52 directs hydraulic fluid 90 from a hydraulic fluid reservoir 84 through intake valves 54 and to cylinders 36.

A power stroke manifold 64 directs hydraulic fluid from the cylinders 36 to output valves 66. The rising wave 500 pushes the float 10 upward, and the pressurized hydraulic fluid 90 flows to the hydraulic motor 76. The hydraulic motor 76 is powered by the pressurized hydraulic fluid 90 and drives the attached speed control coupling 78. The speed control coupling 78 connects hydraulic motor 76 to the electric generator 80 and controls the speed of the electric generator 80. The electric generator 80 is selected to match the frequency, voltage and kilowatt rating of the anticipated electrical load.

A pipeline 82 returns exhausted hydraulic fluid 90 from hydraulic motor 76 to the hydraulic reservoir 84. This is a close loose loop system that can be initiated by opening a remotely operated valve 86.

During periods of wave energy converter inactivity, a secondary source of renewable clean energy is provided by hydrogen fuel cell assembly. Use of the hydrogen fuel cell assembly combined with wave energy converter as the primary source of energy provides energy production at each module to approximately 6,159,024 kW/h.

The sequence of operation can be considered a standard for all applications of the basic design of this power plant. However, the arrangements and quantities of float cylinders 10, piston assemblies 30, and machined cylinders 36 components of the modules can be modified in quantity and physical arrangement for meeting the desired goal of energy required at any given site.

These together with other objects of the apparatus, system and method for generating electricity by using the reciprocating motion of floats caused by waves, along with the various features of novelty that characterize the system or method, are described with particularity in the specification and drawings forming a part of this disclosure. For a better understanding of the apparatus, system and method for generating electricity by using the reciprocating motion of floats caused by waves, reference should be made to the attached drawings and descriptive materials in which there are illustrated preferred embodiments of the system or method.

BRIEF DESCRIPTION OF DRAWINGS

The above stated features, aspects, and advantages of the apparatus, system and method for generating electricity by using the reciprocating motion of floats caused by waves will become better understood with regard to the following description and accompanying drawings as further described.

FIG. 11 is a table of energy generated calculations used for determining the energy from a 3-foot wave imparted on one 8-foot diameter float cylinder 10 expressed by V (the volume of water displaced) times BMR (buoyancy Module radius) times WH (wave height) times D/T (the buoyancy module distance traveled over time).

FIG. 12 is a table of annual energy production applied to the potential of one 40-foot by 40-foot platform employing an embodiment of an apparatus, system and method for generating electricity by using the reciprocating motion of twenty (20) float cylinders 10 caused by waves 500 with four parallel trains of five (5), eight, 8-foot diameter float cylinders 10 from the energy calculations of FIG. 11, showing calculations for wave of 1-4 meters showing the energy generation factor from wave energy (WEC) and a back-up auxiliary source (AUX).

FIG. 13 is a table of gross revenue projection of the embodiment of an apparatus, system and method for generating electricity by using the reciprocating motion of float cylinders 10 caused by waves of the table of FIG. 12.

BEST MODE FOR CARRYING OUT THE INVENTION

Figure 1:
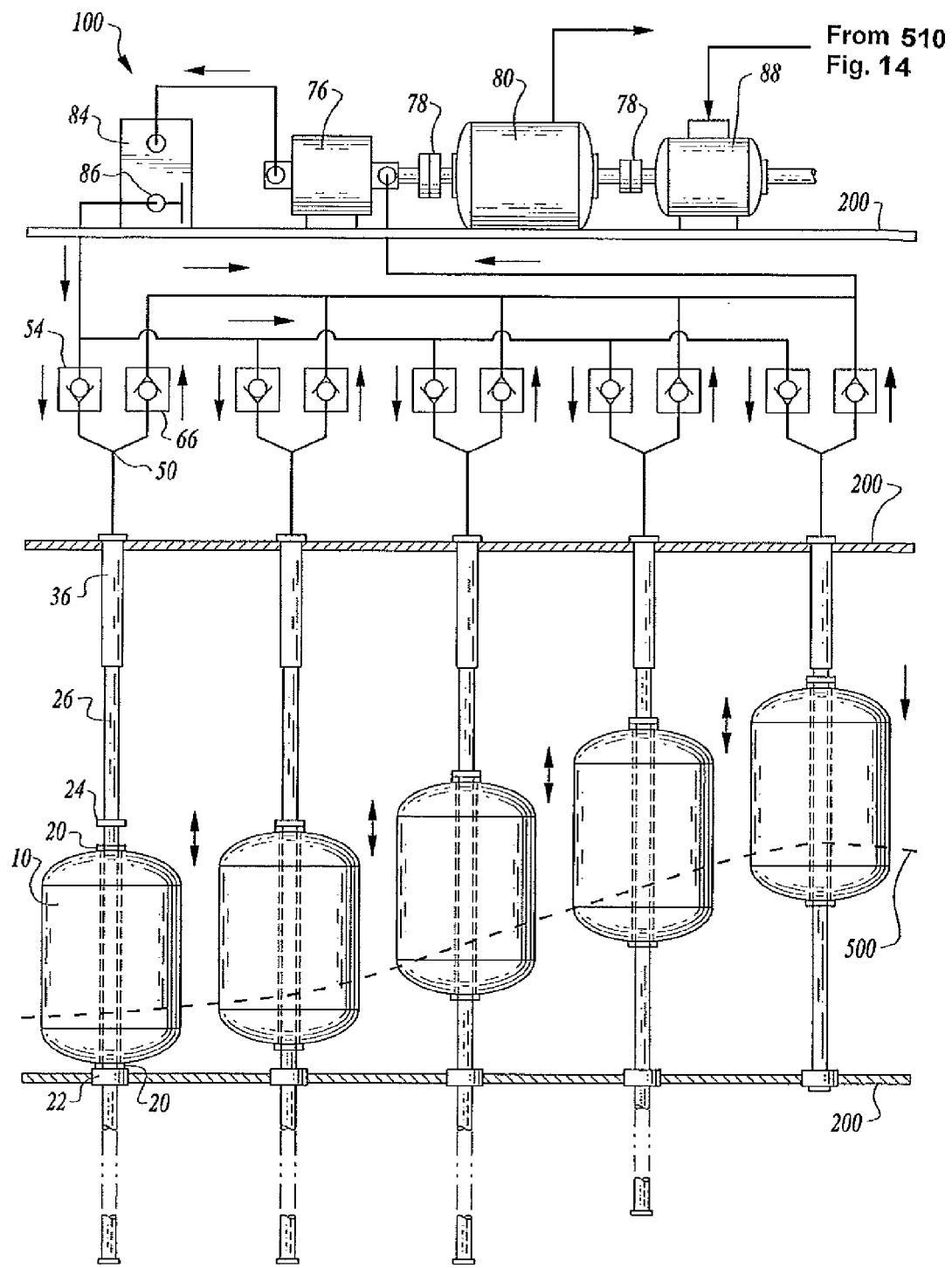
FIG. 1 is an elevation view of and embodiment of apparatus assembly and system flow schematic 100 that depicts the sequence of operation for generating electrical energy utilizing the components for an apparatus, system and method for generating electricity from the reciprocating motion of cylinder floats 10 caused by waves for a train of five cylinder floats 10. Other than being connected to the output, the electrical distribution network is not a part of the apparatus, system and method for generating electricity by using the reciprocating motion of floats caused by waves, and is customized to meet the demands of end users by additional engineering.
Figure 3:
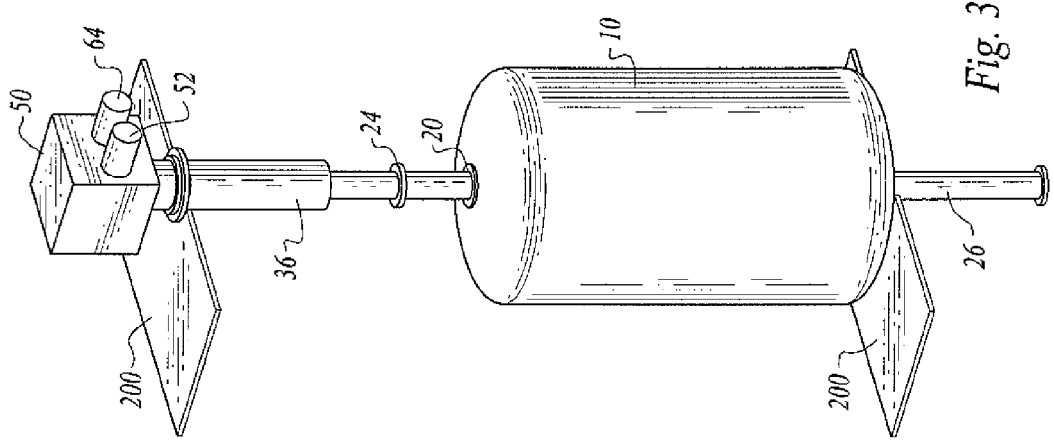
FIG. 3 is a perspective view of a cylinder float 10, pushrod 26, machined cylinder 36 and hydraulic check valve assembly 50 of a representative float cylinder 10 of FIG. 1.
Figure 2:
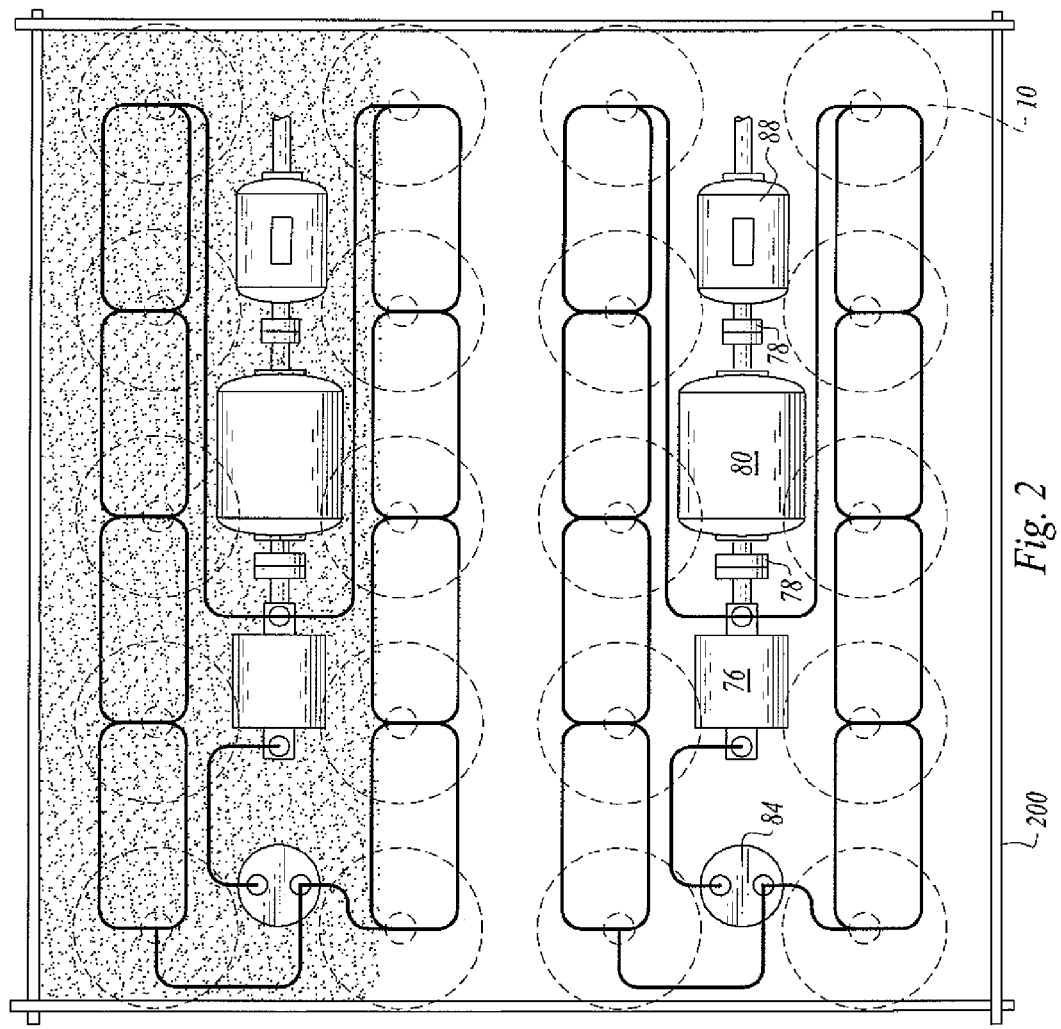
FIG. 2 is a representative top planar view of FIG. 1, depicting an embodiment including array of twenty cylinder floats 10 in four trains of five cylinder floats 10 each.
Figure 5:
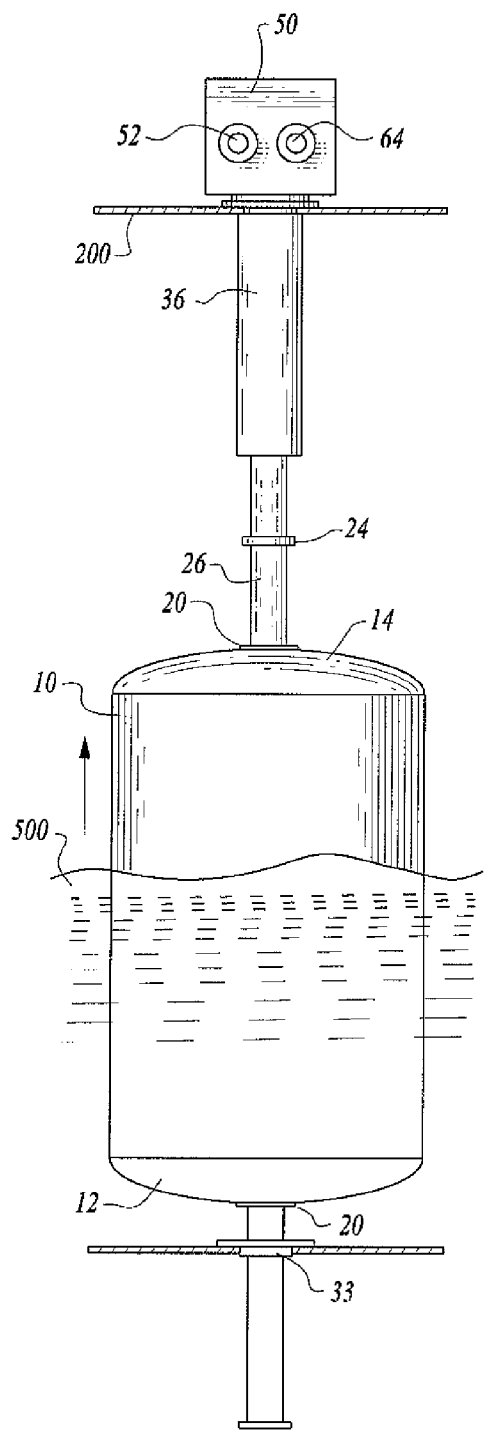
FIG. 5 is a representative elevation view of cylinder float 10, pushrod 26, machined cylinder 36 and hydraulic check valve assembly 50 of FIG. 1 with the cylinder float 100 rising on the wave 500.
Figure 6:
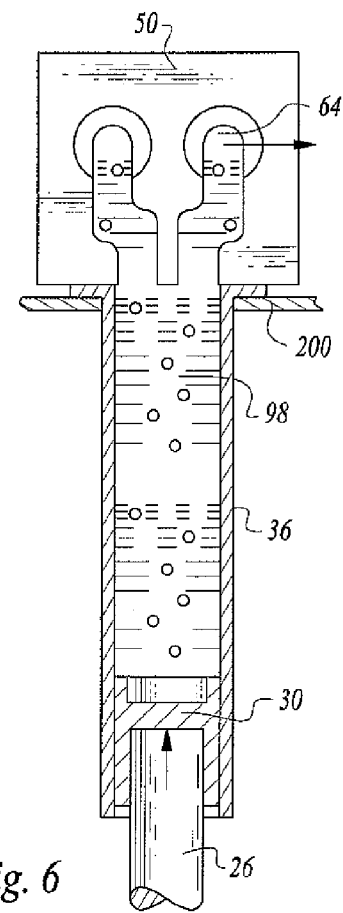
FIG. 6 is a representative detail sectional elevation view of an embodiment of pushrod 26, piston assembly 30, machined cylinder 36 and hydraulic check valve assembly 50 of a representative float cylinder 10 of FIG. 5 depicting hydraulic fluid 90 displaced from the machined cylinder 36 by the float cylinder 10 rising on the wave 500 of FIG. 5.
Figure 4:
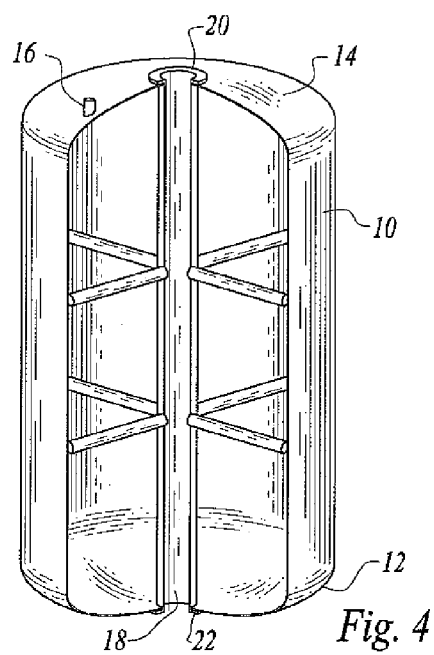
FIG. 4 is a representative cut-away perspective view of an embodiment of a float cylinder 10 of FIG. 1.
Figure 7:
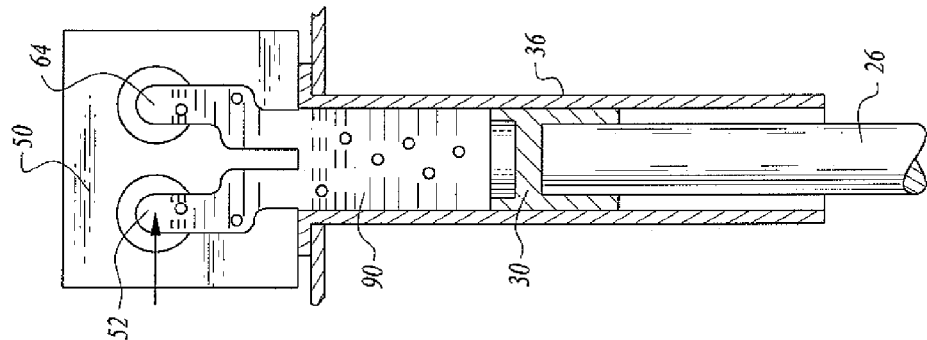
FIG. 7 is a representative elevation view of cylinder float 10, pushrod 26, machined cylinder 36 and hydraulic check valve assembly 50 of FIG. 1 with the float at the maximum height on the wave 500.
Figure 8:
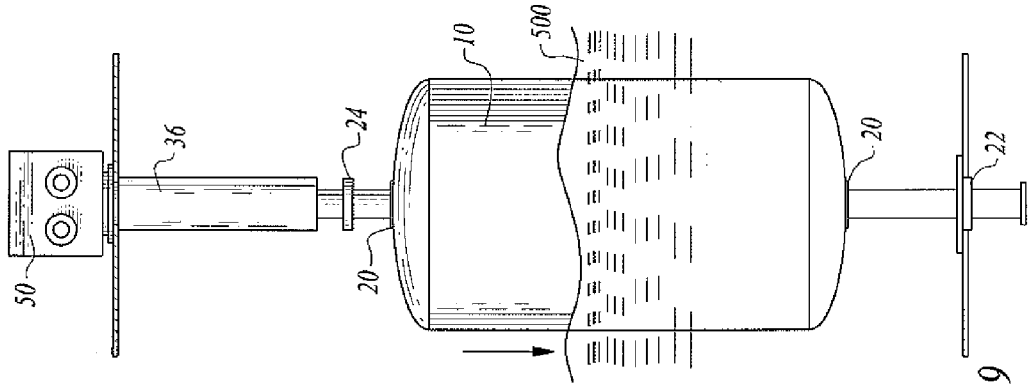
FIG. 8 is a representative detail sectional elevation view of an embodiment of pushrod 26, piston assembly 30, machined cylinder 36 and hydraulic check valve assembly 50 of a representative float cylinder 10 of FIG. 5 depicting hydraulic fluid 90 displaced from the machined cylinder 36 by the float cylinder 10 rising on the wave 500 of FIG. 7.
Figure 9:
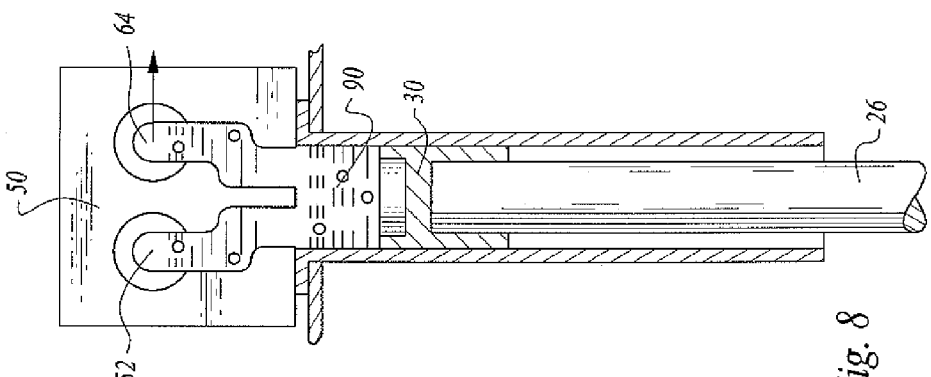
FIG. 9 is a representative elevation view of cylinder float 10, pushrod 26, machined cylinder 36 and hydraulic check valve assembly 50 of FIG. 1 with the float lowering on the wave 500.
Figure 10:
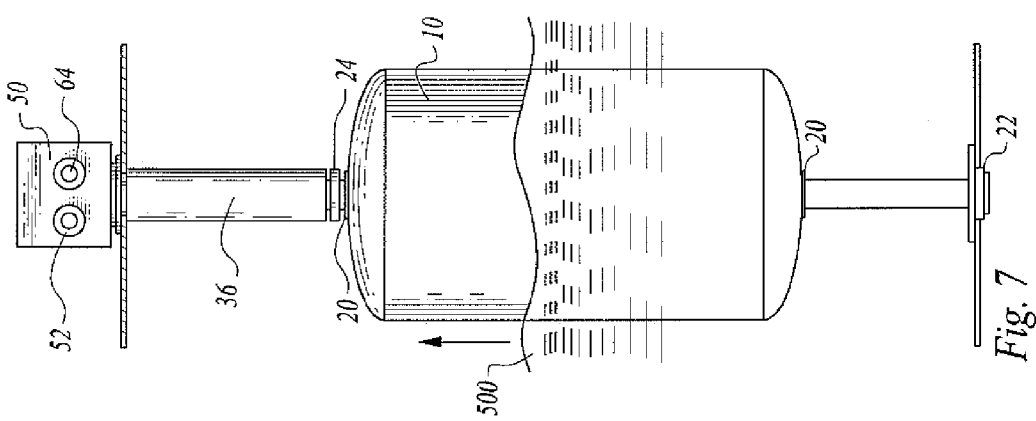
FIG. 10 is a representative detail sectional elevation view of an embodiment of an embodiment of pushrod 26, piston assembly 30, machined cylinder 36 and hydraulic check valve assembly 50 of a representative float cylinder 10 of FIG. 9 depicting hydraulic fluid 90 flowing into the machined cylinder 36 by the float cylinder 10 lowering on the wave 500 of FIG. 9.

Referring more specifically to the drawings, for illustrative purposes the apparatus, system and method for generating electricity by using the reciprocating motion of floats caused by waves is embodied generally in FIGS. 1-13. It will be appreciated that the system may vary as to configuration and as to the details of the parts, and that the method of using the system may vary as to details and to the order of steps, without departing from the basic concepts as disclosed herein. The apparatus, system and method for generating electricity by using the reciprocating motion of floats caused by waves are disclosed generally. However, the disclosed apparatus, system and method for generating electricity by using the reciprocating motion of floats caused by waves may be used in a large variety of electrical generating applications, as will be readily apparent to those skilled in the art.

The apparatus, system and method for generating electricity by using the reciprocating motion of floats caused by waves includes a plurality of floats welded to form a plurality of separate cylinder floats 10. Each cylinder float 10 has domed ends, bottom and top, and 14 respectively, and a central tube seam 18 welded to the drum ends. The top drum end 14 for each float cylinder 10 includes an air valve 16 similar to those used in inflating pneumatic tires. The float cylinder 10 assembly is air tight and is inflated with pressurized air and tank tested to ensure each float cylinder 10 is leak free. A permanent corrosion free tag is affixed to each cylinder drum top end 14 to certify the integrity of the float cylinder 10.

Statistical data of height, frequency and intervals between waves is critical for designing a power plant that delivers power on a continual basis without lapses caused by intervals of wave energy. The apparatus, system and method of electrical power generation utilizing reciprocating motion of floats caused by waves takes advantage of all these conditions, like, especially the lapses between waves, a design based on the frequency of waves available at fairly precise intervals.

A guide bearing 20 is fastened to each float cylinder 10 top and bottom domed end, and 14, to allow the float cylinder 10 to slide freely up and down a cylinder push rod 26, and each float cylinder 10 and associated cylinder push rod 26 to slide freely up and down within a pier mounted point absorber superstructure assembly 200 situated within and above a portion of ocean, sea, gulf, bay or lake. A separate guide bearing 22 affixed to the pier mounted point absorber superstructure assembly 200 further allows the float cylinder 10 and associated cylinder push rod 26 to slide freely up and down within the pier mounted point absorber superstructure assembly 200 in precise vertical alignment with a piston assembly 30 affixed to the top end of each push rod 26, and in conjunction with guide bearings 20. Guide bearing 22 and the pier mounted point absorber superstructure assembly 200 serves to limit the lower vertical travel of the float cylinder 10.

A travel stop 24 is affixed to the cylinder push rod 26 to limit the upper vertical travel of the float cylinder 10 on the associated cylinder push rod 26. In this manner, the cylinder push rod 26 raises and lowers the piston assembly 30 in response to the rising and falling of the float cylinders 10 in response to the action of waves 500. The piston assembly 30 travels in the machined cylinder 36 in a sequential fashion that extends piston 30 travel to the total distance between high and low levels of the travel stop 24.

The machined cylinder 36 of suitable length and internal diameter allows the primary piston to travel the predetermined length of one third of the total distance of high and low limits of the travel stop 24.

A threaded custom pipe flange threaded onto the top end of the machined cylinder 36 has two rows of concentric bolt circles, the circles arranged as an outer row and an inner row. The outer row of bolt circles is provided to bolt the machined cylinder 36 to the structural support. The inner row of bolt circles is provided for bolting a custom "Y" fitting 50 to the pipe flange. Each custom "V" fitting 50 has two one-way check valves. An intake manifold 52 directs hydraulic fluid from a hydraulic fluid reservoir 84 through an intake valve 54 and to each machined cylinder 36.

An intake manifold 52 (a main pipe with multiple branches) delivers hydraulic fluid 90 from the reservoir to each intake valves 54. The delivery occurs as the float cylinders 10 travel downward with a receding wave 500. Intake check valves 54 mounted on the custom "Y"-shaped fitting 50 allow the hydraulic fluid to travel in one direction, into each machined cylinder 36. The lower the float cylinder 10 travels, the deeper the piston assembly 30 travels down the machined cylinder 36, and at low tide the push rod 26 and piston assembly 30 will travel to their limits of travel and hydraulic fluid 90 will fill the machined cylinder 36. The output or power stroke check valves 66 are attached to the other leg of the custom "Y"-shaped fitting 50. As the float cylinder 10 rises with the rising wave 500, the piston correspondingly rises and forces the hydraulic fluid through the output or power stroke check valves 66 into the power stroke manifold 64.

A power stroke manifold 64 directs hydraulic fluid 90 from the machined cylinders 36 to output valves 66. The rising wave pushes the float cylinders 10 upward, and the pressurized hydraulic fluid flows to the hydraulic motor 76. In this manner, the pattern of waves passing through the float cylinders 10 forces the hydraulic fluid 90 into the hydraulic motor 76 and converts the linear motion of the float cylinders 10 into rotary motion. The hydraulic motor 76 is powered by the pressurized hydraulic fluid 90 and drives the attached speed control coupling 78. The speed control coupling 78 is an equivalent to inertial speed control coupling devices known in the art, and connects hydraulic motor 76 to the electric generator 80 and controls the speed of the electric generator 80, and as such prevents rotational speed variations between the hydraulic motor 76 and the electric generator 80 in response to transient load conditions on the hydraulic motor. The electric generator 80 is selected to match the frequency, voltage and kilowatt rating of the anticipated electrical load. The manifolds and check valves of the apparatus, system and method of electrical power generation utilizing reciprocating motion of floats caused by waves receive and direct the energized hydraulic fluid 90 to the hydraulic motor 76 that drives that the electric generator 80. The exhausted hydraulic fluid 90 returns to the hydraulic fluid reservoir 84 in a continuous flow in a closed loop that repeats itself.

A pipeline 80 returns exhausted hydraulic fluid from hydraulic motor 14 to the hydraulic fluid reservoir 84. This is a close loose loop system that can be initiated by opening a remotely operated valve 86. The valve 86 located on the hydraulic fluid reservoir 84 must be in the open position to deliver fluid to the intake manifold 52 for the operating sequence to begin.

The sequence of operation can be considered a standard for all applications of the basic design of this power plant. However, the arrangements and quantities of float cylinders 10, piston assemblies 30, and machined cylinders 36 components can be modified in quantity and physical arrangement for meeting the desired goal of energy required at any given site. An embodiment includes cylinder push rods that are telescoping between the cylinder push rod bottom end and the push rod to end.

All of the above disclosed devices are mounted on a rigid platform portion within the pier mounted point absorber superstructure assembly 200, providing a plurality of cylindrical points configured to absorb the kinetic wave energy, FIG. 1. The changes in water level—high tide, low tide, small wave, big wave—in an embodiment of the apparatus, system and method of electrical power generation utilizing reciprocating motion of floats caused by waves adjust to these changing conditions with telescopic piston push rod assemblies 30 that extend and retract by following the floats as they adapt to water level.

The method of calculating energy generated is commonly referred to as positive displacement. Several factors are involved in making these calculations. Knowing how the floats respond to a passing wave is the first step in approaching the solution to the question of how much energy can the system can generate. The float cylinders 10 are supported on their axis by a cylindrical pushrod 26, and are free to slide up and down as the wave passes. In this unrestricted mode, the float cylinder 10 contributes nothing to the desired end results.

If the float cylinder 10 is inhibited in its path by a piston assembly 30 in a machined cylinder 36 filled with hydraulic fluid 90, the piston assembly 30 will rise in response to the rising float cylinder 10. The hydraulic fluid 90 enters the hydraulic motor 76 and its forward progress is obstructed by veins in the hydraulic motor 76. The float 10/piston assembly 30 meet resistance to the float cylinder 10 progress and the float cylinder 10 is surrounded by the advancing wave. The amount of water that the float cylinder 10 sinks into the wave is referred to as "positive displacement." The energy available from float cylinders 10 responding to waves 500 can be calculated by knowing the volume of water displaced, forward progress of the wave and the vertical distance the float cylinder 10 traveled any given time. From these variables the energy generated by the float cylinder 10 is calculated by the following equation: V (volume of water (pi(3.14)×FR (the radius of the float))×WH (wave height)×DIT (the float distance traveled over time). Results using this equation are provided in FIGS. 11-13 for wave 500 heights ranging from 3 feet to 12 feet.

This pattern of waves passing through the float cylinders 10 forces the hydraulic fluid 90 into the hydraulic motor 76 and converts the linear motion of the float cylinders 10 to rotary motion.

Each float cylinder 10 is custom crafted to perform a particular function within a chain of events that are peculiar to a wave 500 power generating plant. The power generating plant is designed to function when placed in the ocean, sea, gulf, bay or lake in an area that has the desired wave action. While in this environment the float cylinder 10 will rise and fall in response to waves 500 passing through the generating plant. The primary function of the float cylinder 10 is to transfer the energy from the rising wave 500 to the succeeding combined components.

It is necessary to maintain control of the float cylinder 10 at all times so that the float cylinder 10 travels vertically and in precisely controlled movements. The cylindrical pushrod 26 passes through the central axis 18 of the float cylinders 10. Guide bearing 22 at the bottom limit of vertical travel and guide bearings 20 on the top end 14 and bottom end 12 of each float cylinder 10 maintain the precise control of alignment of the float cylinder 10 within the machined cylinder 36. The top end of the pushrod 26 is fastened to the piston assembly 30. As the float cylinder 10 travels vertically the upper limit of travel is at the travel stop 24 of the connected cylinder push rod 26, and the bottom limit of travel is at the bottom guide bearing 22 affixed to the pier mounted point absorber superstructure assembly 200. In this fashion, the float cylinder 10 and connected cylinder push rod 26 are allowed to slide freely up and down within the pier mounted point absorber superstructure assembly 200 in precise vertical alignment with the piston assembly 30, and in conjunction with guide bearing guide bearings 20 on the top end 14 and bottom end 12 of each float cylinder 10, and guide bearing 22 affixed to the pier mounted point absorber superstructure assembly 200.

The modular concept of multiple pistons of the apparatus, system and method of electrical power generation utilizing reciprocating motion of float cylinders 10 caused by waves is meant to resemble a multi-cylinder internal combustion engine that provides uniform continuous flow of energy to the rotating parts. This continuity produces energy from waves as small as 3 feet (1 meter) and as large as 12 feet (4 meters), FIGS. 11-13.

An embodiment of apparatus, system and method of electrical power generation utilizing reciprocating motion of float cylinders provides a wave energy converter module measuring 40 feet by 40 feet (approximately 12 meters by 12 meters), can produce up to 1 megawatt of electrical power, or enough electrical energy to power approximately 1000 U.S. homes. The calculations used for determining the energy from a 3-foot wave imparted on one 8-foot diameter float cylinder 10 are presented in FIG. 11. When applied to the potential of one 40-foot by 40-foot pier mounted point absorber superstructure assembly using the reciprocating motion of twenty (20) float cylinders 10 caused by waves 500 having wave heights from 1 meter to 4 meters through four parallel trains of five (5), eight, 8-foot diameter float cylinders 10, the annual energy production is summarized in FIG. 12.

With available data, power output potentials can be calculated at any site. Based on the annual energy production summary of FIG. 12, a gross revenue projection from one 40-foot by 40-foot pier mounted point absorber superstructure assembly 200 with parallel 8-foot diameter float cylinder 10 energy trains is depicted in FIG. 13.

Figure 14:
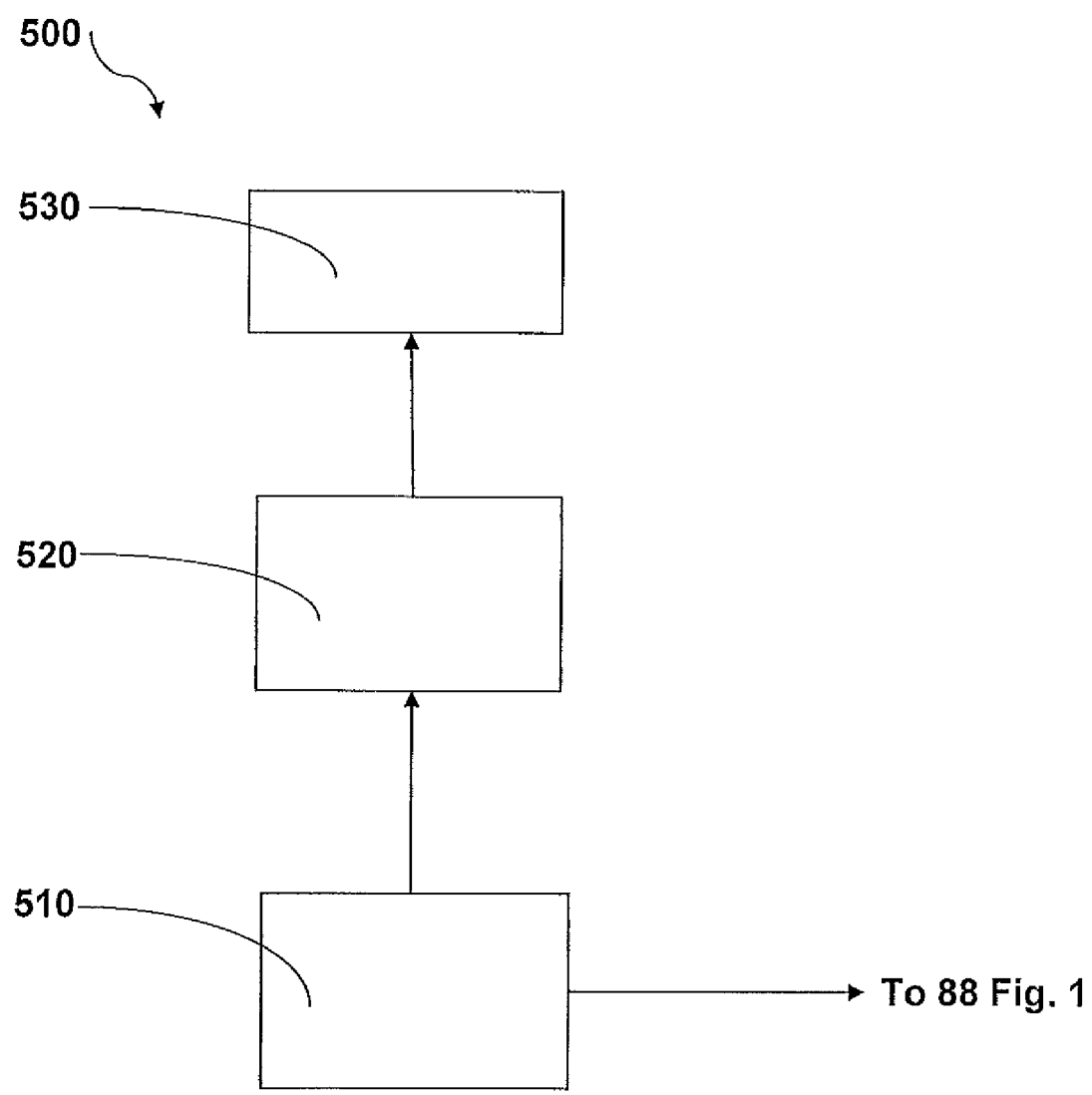
FIG. 14 is a representative schematic of hydrogen fuel cell including at least one carbonate fuel cell system 500 having at least one direct fuel cell 510, at least one carbon dioxide separator 520, and assembly for carbon dioxide capture 530 connected to the electrical grid assembly.

During periods of wave energy converter inactivity, a secondary source of backup or emergency renewable clean energy is provided. Use of such auxiliary emergency power supply, such as a land based hydrogen fuel cell assembly, combined with wave energy converter as the primary source of energy provides energy production at each module to approximately 9,073,200 kW per year, FIG. 13. An embodiment of hydrogen fuel cell includes at least one carbonate fuel cell system 500 having at least one direct fuel cell 510, at least one carbon dioxide separator 520, and assembly for carbon dioxide capture 530 connected to the electrical grid assembly, FIG. 14. The fuel cell powers an electrical motor 88 connected to the electric generator 80 by a speed control coupling 78, FIG. 1.

Therefore, the foregoing is considered as illustrative only of the principles of the apparatus, system and method for generating electricity by using the reciprocating motion of floats caused by waves. Additionally, since numerous modifications and changes will readily occur to those skilled in the art, it is not desired to limit the apparatus, system and method for generating electricity by using the reciprocating motion of floats caused by waves to the exact construction and operation shown and described, and further, all suitable modifications and equivalents may be resorted to, falling within the scope of the disclosed apparatus, system and method.

I claim:
1. Apparatus for generation of electricity from reciprocating motion of floats caused by waves, the apparatus comprising, in combination:
   a) a pier mounted point absorber superstructure assembly situated within and above a portion of ocean, sea, gulf, bay or lake;
   b) a plurality of floats welded to form a plurality of separate first cylinders, each first cylinder comprising a domed top end and a domed bottom end and a central tube seam welded to the domed cylinder ends, the domed top end for each cylinder comprising an air valve;
   c) a push rod assembly extending longitudinally through each said central tube seam welded to the first cylinder ends, the push rod assembly comprising a bottom end and a top end;
   d) piston assembly within the pier mounted point absorber superstructure assembly and attached to each push rod assembly top end;
   e) guide bearings fastened to each float domed top end, the guide bearings sized to receive and vertically align the moveable push rod assembly with the piston assembly;
   f) guide bearings affixed to the pier mounted point absorber superstructure assembly, the guide bearings sized to receive and align the moveable push rod assembly with the piston assembly;
   g) a travel stop affixed to the push rod above each first cylinder top end;
   h) a plurality of second cylinder housings within the pier mounted point absorber superstructure assembly, each second cylinder housing machined to receive and house each vertically aligned piston assembly and push rod assembly top end, the second cylinder housing comprising a threaded top end;
   i) a threaded pipe flange threaded onto the top end of each second cylinder housing, the threaded pipe flange comprising two rows of concentric bolt circles, the bolt circles arranged as an outer row and an inner row, the outer row of bolt circles comprising fastening means for bolting the second cylinder housing to a structural support and the inner row of bolt circles comprises fastening means for bolting a custom "Y" fitting to the threaded pipe flange, each said custom "Y" fitting comprising two one-way check valves, one said valve serving as an intake valve and the other said valve serving as an output valve;
   j) at least one hydraulic fluid reservoir, each such reservoir comprising a volume of hydraulic fluid;
   k) at least one hydraulic motor;
   l) at least one electrical generator, each such electrical generator selected to match the frequency, voltage and kilowatt rating of an anticipated electrical load;
   m) at least one intake manifold assembly connecting the at least one hydraulic fluid reservoir through intake valves to the second cylinder housings;
   n) at least one power stroke manifold assembly connecting the second cylinder housings through output valves to the at least one hydraulic motor;
   o) a speed control coupling between each at least one hydraulic motor and each at least one electrical generator;
   p) closed loop pipeline assembly connecting the at least one hydraulic motor to the at least one hydraulic fluid reservoir;
   q) an electrical grid assembly connected to the at least one electrical generator;
   whereby an upward wave motion through the floats forces each float to travel upward on the corresponding pushrod such that the to float end contacts the corresponding pushrod travel stop and drives the pushrod upwards into the piston assembly to displace the hydraulic fluid in the closed loop hydraulic system into at least one hydraulic motor, that converts the kinetic energy of linear float motion to rotary motion to drive at least one electrical generator, and a downward wave motion allows the float to freely slide down on the push rod such that the hydraulic fluid in the closed loop hydraulic system is allowed to drive the piston assembly and connected push rod downwards; and r) means for backup or emergency renewable clean energy.

2. The apparatus of claim 1, further comprising wherein means for backup or emergency renewable clean energy comprises: at least one carbonate fuel cell system comprising at least one direct fuel cell, at least one carbon dioxide separator, and means for carbon dioxide capture connected to the electrical grid assembly, whereby the fuel cell system drives at least one electric motor connected to at least one electric generator by a speed control coupling.

3. The apparatus of claim 1, wherein the push rod assembly further comprises telescoping push rods between the push rod bottom end and the push rod top end.

4. A system for harnessing kinetic energy of waves to generate electricity, the system comprising, in combination:
   a) a pier mounted point absorber superstructure assembly above a portion of ocean, sea, gulf, bay or lake;
   b) a plurality of buoyancy modules within the point absorber superstructure assembly, each such buoyancy module aligned on a vertical push rod and contacting the waves providing a range of buoyancy module vertical motion along the push rod where a top portion of each buoyancy modules contacts a fixed stop point on the push rod as an upward movement of the waves travels through the buoyancy modules;
   c) a piston assembly within a cylinder attached to a top end of each vertical push rod for receiving the vertical motion of the buoyancy module contacting the push rod fixed stop point and push rod from an upward movements of the waves;
   d) means for closed loop hydraulic fluid assembly and hydraulic motor wherein the piston assembly compresses hydraulic fluid of the closed loop hydraulic fluid assembly and drives the hydraulic motor, said piston assembly and means for closed loop hydraulic fluid assembly allows each buoyancy module to freely slide downward on the push rod as a downwards movement of the waves travels through the buoyancy modules, and the hydraulic fluid in the closed loop hydraulic system drives each corresponding piston assembly and connected push rod downwards;
   e) means for electric generator connected to and driven by the means for hydraulic motor; and
   f) means for transmitting electrical energy from the means for electric generator into an electrical power grid.

5. The system according to claim 4, wherein the range of buoyancy module vertical motion is from three feet to twelve feet.

6. The system according to claim 4, wherein means for closed loop hydraulic fluid assembly and hydraulic motor comprise, in combination:
   a) check valve assembly communicating with each cylinder and piston assembly and comprising two one-way check valves, one such valve serving as an intake valve and the other such valve serving as an output valve;
   b) at least one intake manifold assembly connected to the intake valve for each cylinder;
   c) at least one power stroke manifold assembly connected to the output valve for each cylinder;
   d) at least one hydraulic fluid reservoir, each such reservoir comprising a volume of hydraulic fluid;
   e) closed loop piping assembly linking the check valve assembly, intake manifold assembly, power stroke manifold assembly, and the at least one hydraulic fluid reservoir; and
   f) at least one hydraulic motor within the closed loop piping assembly.

7. The system according to claim 4, wherein means for electric generator connected to and driven by the means for hydraulic motor and means for transmitting electrical energy from the means for electric generator into an electrical power grid comprise, in combination:
   a) at least one electrical generator, each such electrical generator selected to match the frequency, voltage and kilowatt rating of an anticipated electrical load;
   b) a speed control coupling between each at least one hydraulic motor and each at least one electrical generator; and
   c) an electrical grid assembly connected to the at least one electrical generator.

8. The system according to claim 4, wherein the piston push rod assembly further comprises telescoping pistons push rods between the push rod bottom end and the push rod top end.

9. The system according to claim 4, further comprising at least one carbonate fuel cell system comprising at least one direct fuel cell, at least one carbon dioxide separator, and means for carbon dioxide capture connected to the electrical grid assembly, whereby the fuel cell system drives at least one electric motor connected to at least one electric generator by a speed control coupling.

10. An electrical generation system comprising a closed loop hydraulic fluid assembly driving at least one hydraulic motor coupled to at least one electric generator, in which the hydraulic fluid is circulated through the closed loop by pistons driven by a plurality of buoyancy modules moved by wave energy expressed by V (the volume of water displaced) times BMR (buoyancy Module radius) times WH (wave height) times D/T (the buoyancy module distance traveled over time), and wherein the buoyancy modules are within a point absorber superstructure assembly, each such buoyancy module aligned on a vertical push rod having a buoyancy module upward motion stop position, and contacting the wave providing a range of buoyancy module vertical motion as passing waves travel through the buoyancy modules whereby each vertical push rod buoyancy module upward motion stop position provides transfer of force from an upwardly moving buoyancy module to the push rod and a corresponding piston connected to the push rod, and whereby a downwardly moving buoyancy module freely slides down the push rod, allowing the push rod and the piston to travel downward from the closed loop hydraulic fluid assembly.

11. The system of claim 10, wherein each piston is contained within a cylinder attached to a top end of a vertical push rod for receiving the vertical motion of the buoyancy module and push rod from the waves.

12. The system of claim 10, wherein the closed loop hydraulic fluid assembly comprises, in combination:
   a) check valve assembly communicating with a cylinder and piston assembly and comprising two one-way check valves, one such valve serving as an intake valve and the other such valve serving as an output valve;
   b) at least one intake manifold assembly connected to the intake valve for each cylinder;
   c) at least one power stroke manifold assembly connected to the output valve for each cylinder;
   d) at least one hydraulic fluid reservoir, each such reservoir comprising a volume of hydraulic fluid;

e) closed loop piping assembly linking the check valve assembly, intake manifold assembly, power stroke manifold assembly, and the at least one hydraulic fluid reservoir; and f) at least one hydraulic motor within the closed loop piping assembly.

13. The system of claim 10, wherein each buoyancy module comprises a domed top end, a domed bottom end, and a central tube seam welded to the domed cylinder ends, the domed top end for each buoyancy module further comprising an air valve.

14. The system of claim 10, wherein the push rod assembly further comprises telescoping push rods between the push rod bottom end and the push rod top end.

15. The system of claim 10, further comprising a separate hydrogen fuel cell assembly comprising at least one direct fuel cell, at least one carbon dioxide separator, and means for carbon dioxide capture connected to the electrical grid assembly, whereby the fuel cell system drives at least one electric motor connected to at least one electric generator by a speed control coupling.

\* \* \* \* \*

UNITED STATES PATENT AND TRADEMARK OFFICE
CERTIFICATE OF CORRECTION

| | | |
|---|---|---|
| PATENT NO. | : 7,956,479 B1 | Page 1 of 1 |
| APPLICATION NO. | : 12/639793 | |
| DATED | : June 7, 2011 | |
| INVENTOR(S) | : Ernest Bergman | |

It is certified that error appears in the above-identified patent and that said Letters Patent is hereby corrected as shown below:

In Claim 1, column 10, line 59, the following should be changed as indicated: electrical generator; <u>and r) means for backup or emergency renewable clean energy;</u>

In Claim 1, column 11, line 5, the following should be changed as indicated: wards<s>; and</s><u>.</u>

In Claim 1, column 11, line 6, the following should be changed as indicated: <s>r) means for backup or emergency renewable clean energy.</s>

In Claim 2, column 11, line 7, the following should be changed as indicated: The apparatus of claim 1, <s>further comprising</s> wherein Signed and Sealed this
Fifteenth Day of November, 2011

David J. Kappos
*Director of the United States Patent and Trademark Office*